United States Patent [19]

Shimuzu

[11] Patent Number: 5,005,933
[45] Date of Patent: Apr. 9, 1991

[54] NON-LINEAR OPTICAL DEVICE

[75] Inventor: Akira Shimuzu, Inagi, Japan

[73] Assignee: Canon Kabushiki Kaisha, Tokyo, Japan

[21] Appl. No.: 413,733

[22] Filed: Sep. 28, 1989

[30] Foreign Application Priority Data

Sep. 30, 1988 [JP] Japan ................................ 63-246324

[51] Int. Cl.$^5$ .......................... G02B 6/10; H01L 27/14; H03F 7/00

[52] U.S. Cl. .............................. 350/96.14; 350/96.11; 350/96.12; 350/96.34; 350/355; 357/16; 357/30; 307/425; 307/430

[58] Field of Search ............... 350/96.11, 96.12, 96.13, 350/96.14, 96.15, 96.34, 354, 355, 356; 357/17, 19, 23.2, 30, 45, 4, 16; 307/403, 425, 430

[56] References Cited

U.S. PATENT DOCUMENTS

| | | | |
|---|---|---|---|
| 4,549,788 | 10/1985 | Chemla | 350/354 |
| 4,626,075 | 12/1986 | Chemla | 350/96.14 X |
| 4,716,449 | 12/1987 | Miller | 357/30 |
| 4,737,003 | 4/1988 | Matsumura et al. | 350/96.14 |
| 4,818,079 | 4/1989 | Maserjian | 350/354 |
| 4,840,446 | 6/1989 | Nakamura et al. | 350/96.13 |
| 4,873,610 | 10/1989 | Shimuzu et al. | 361/313 |
| 4,936,645 | 6/1990 | Yoon et al. | 350/96.14 |
| 4,946,235 | 8/1990 | Scozzafava et al. | 350/96.34 |
| 4,948,225 | 8/1990 | Rider et al. | 350/96.34 |

OTHER PUBLICATIONS

*Journal of Lightwave Technology*, vol. 6, No. 6, Jun. 1988, pp. 953-970, Stegeman, G., et al., "Third Order Nonlinear Integrated Optics".

*Physical Review Letters*, vol. 61, No. 5, Aug. 1, 1988, pp. 613-616, Shimuzu, A., "Optical Nonlinearity Induced by Giant Dipole Moment of Wannier Excitons".

*Physical Review*, vol. 37, No. 14, May 15, 1988, pp. 8527-8529, Shimuzu, A., "Excitonic Optical Nonlinearity of Quantum-Well Structures in a Static Electric Field".

*Primary Examiner*—Brian Healy
*Attorney, Agent, or Firm*—Fitzpatrick, Cella, Harper & Scinto

[57] ABSTRACT

A non-linear optical device for carrying out optical signal processing using a non-linear optical material having a biasing electric field perpendicularly applied to a semiconductor that is laminated to form a quantum well structure. A well layer of the quantum well structure has substantially the same thickness as the Bohr radius of an exciton, and the magnitude of the biasing electric field is selected so that the distance between centers of gravity of an electron and a hole, which constitute the exciton, is from a fraction of to substantially equal to the effective Bohr radius. The thickness and potential of a barrier layer of the quantum well structure is selected such that the increase in the width of the absorption peak of the exciton caused by ionization due to tunneling in the biasing electric field is smaller than the width of the absorption peak with no electric field, and the wavelength of light used to activate the device is selected such that the photon energy $n\omega$ is substantially equal to or slightly smaller than $E_{ex}/2$, where $E_{ex}$ is the energy generated by the exciton of the quantum well structure. That light is polarized, and its electric field vector has a component normal to the layer of the quantum well structure.

7 Claims, 4 Drawing Sheets

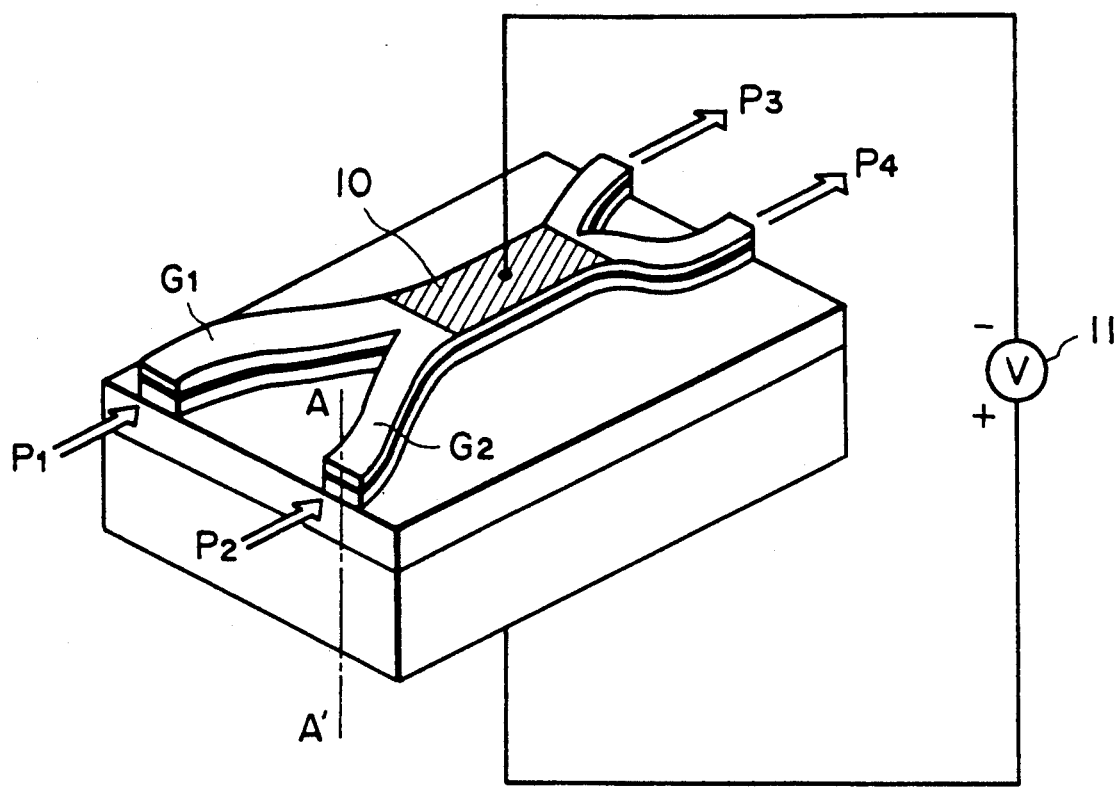
FIG. 3
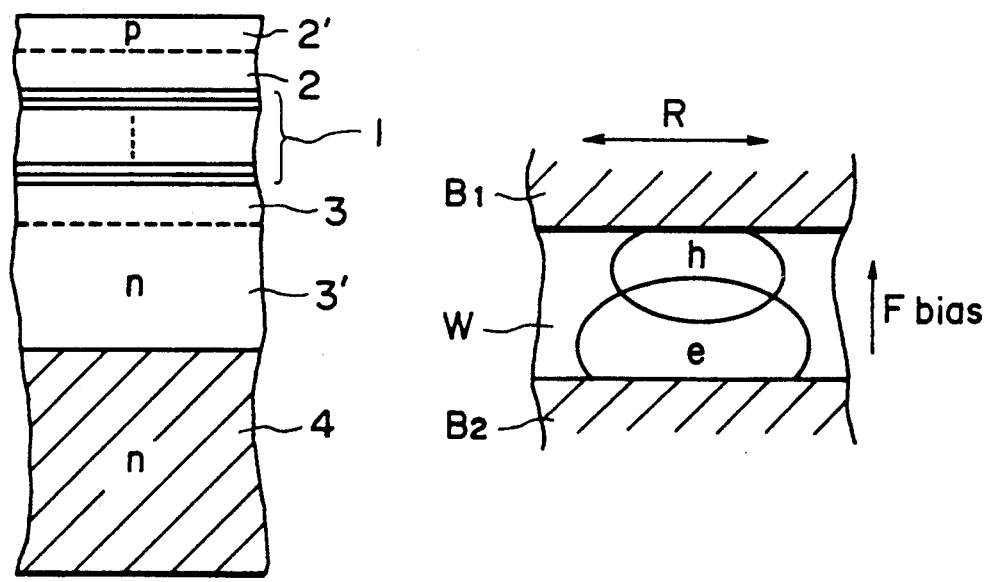
FIG. 4
FIG. 5

NON-LINEAR OPTICAL DEVICE

BACKGROUND OF THE INVENTION

1. Field of the Invention

The present invention relates to a non-linear optical device which modulates or switches a light and carries out an operation by the light by making use of an optical non-linearity of a material Such a device serves as a basic component in transmitting or processing information by using the light.

2. Related Background Art

A non-linear optical device (NOD) have been reported by G. I. Stegeman et al in the Journal of Lightwave Technology, 6,953 (1988). A typical example of the NOD introduced in the above article is shown in FIG. 1, in which two optical wave guides a and b are coupled in a coupling area c shown by hatching lines. When light inputs P1 and P2 are applied to input terminals (left side in FIG. 1) of the optical wave guides a and b, light outputs P3 and P4 are produced at output terminals (right side) A useful function may be attained by using a non-linear optical material (NOM) in the coupling area c. Namely, a ratio of P1 and P2 may be varied in accordance with intensities of P1 and P2. This makes use of the fact that the coupling length is determined by a refractive index of the area c and the refractive index depends on the light intensity by the optical nonlinearity. By making use of this, an optical AND gate or an optical transistor is fabricated. The NOM used in the coupling area c may be a dielectric material such as $LiNbO_3$ or a semiconductor material such as GaAs, but the latter is superior from the standpoint point of integration with a light emitting device and machining work. In the present invention, the semiconductor conductor material is and therefore explained by comparing a prior art device which also uses the semiconductor material.

In the prior art device, the nonlinearity in a vicinity of a band end of a GaAs or GaAs/AlGaAs multi-quantum well structure (MQWS) was utilized. Namely, a light energy $h\omega$ of the light which activates the NOD is selected to be $h\omega \approx Eex$, where Eex is an energy generated by an exciter of the semiconductor, in order to attain a large nonlinearity. However, this raises the following problems.

(1) The light pulse is distorted in the vicinity of the band end because of a large dispersion of the (linear) refractive index. As a result, it is not possible to apply the very short pulse at a high repetition frequency to activate the NOD, and a very high speed operation which should be an advantage of the optical information processing is not attained.

(2) Because of large absorption, the light intensity is significantly attenuated each time the light passes through each NOD. As a result, frequent amplification in the course of transmission is required. Further, because the absorption $\chi^{(n)}/\alpha$ (where $\chi^{(n)}$ is an n-order non-linear acceptability, and $\alpha$ is an absorption coefficient), which is a figure of merit for the NOM, does not increase even if $\chi^{(n)}$ is large, because $\alpha$ is large.

It has been known that the absorption can be reduced by setting $h\omega$ to be slightly smaller than Eex, but even in such a case, the absorption accompanied by phonon absorption which extends up to several tens of mV below Eex and the two-photon absorption in the range of $h\omega \geq Eex/2$ are not avoidable.

SUMMARY OF THE INVENTION

It is an object of the present invention to provide a non-linear optical device which has low attenuation of light and permits high speed signal processing.

The above object of the present invention is attained by a non-linear optical device for transmitting a light or carrying out optical signal processing by using a non-linear optical material having a biasing electric field applied perpendicularly to a semiconductor laminated to form a quantum well structure, characterized by:

(a) a well layer of the quantum well structure has substantially the same thickness as a Bohr radius of an exciton, (b) the magnitude of the biasing electric field is selected such that a distance between centers of gravity, of an electron and a hole which constitute the exciton is from a fraction of to substantially equal to the effective Bohr radius, (c) the thickness and the potential of a barrier layer of the quantum well structure are selected such that the increase in the width of the absorption peak of the exciton which is caused by the ionization due to the tunneling effect of the exciton under the biasing electric field is smaller than the width of the absorption peak under no electric field, (d) the wavelength of the light to activate the device is selected such that the energy $h\omega$ of the photon is substantially equal to or slightly smaller than Eex/2, where Eex is the generation energy of the exciton of the quantum well structure, and (e) the light which activates the device is a polarized light whose electric field vector has a component normal to the layers of the quantum well structure.

The inventors of the present invention found that large optical nonlinearity is attained at $h\omega \approx Eex/2$ when an appropriate electric field is applied to an appropriate quantum well structure (QWS), and they named it as a GDM effect, which was reported by the inventors in Physical Review Letters, No. 61, p 613 (1988) and Physical Review, No. B37, p 8527 (1988).

In the present invention, the GDM effect is applied to the NOD.

The QWS is used as the NOM for the NOD, and an appropriate electric field (biasing electric field) is applied to the QWS to create the GDM effect. The light used is selected to meet $h\omega \approx Eex/2$.

Because of the GDM effect, much larger nonlinearity than that obtainable when a bulk semiconductor crystal is used as it is attained. Further, since the photon energy is far below the band end, the problems encountered in the prior art device are almost solved. If $h\omega$ is set to be slightly smaller than Eex/2, the two-photon absorption in item (2) of the problems described above is eliminated and all of the problems encountered in the prior art device are solved.

According to the study by the inventors, in order to attain the GDM effect, the thickness of the QWS is selected to be substantially equal to the effective Bohr radius of the exciton, and the magnitude of the biasing electric field is selected such that the distance between the centers of gravity of the electron and the hole which constitute the exciton is substantially equal to or a fraction of the effective Bohr radius.

BRIEF DESCRIPTION OF THE DRAWINGS

FIG. 3 shows a perspective view of one embodiment of the present invention;

FIG. 4 shows a sectional view of the device shown in FIG. 3,

FIG. 5 shows a conceptual view for illustrating a dimension of an exciton relative to an effective Bohr radius.

DESCRIPTION OF THE PREFERRED EMBODIMENTS

Figure 1:
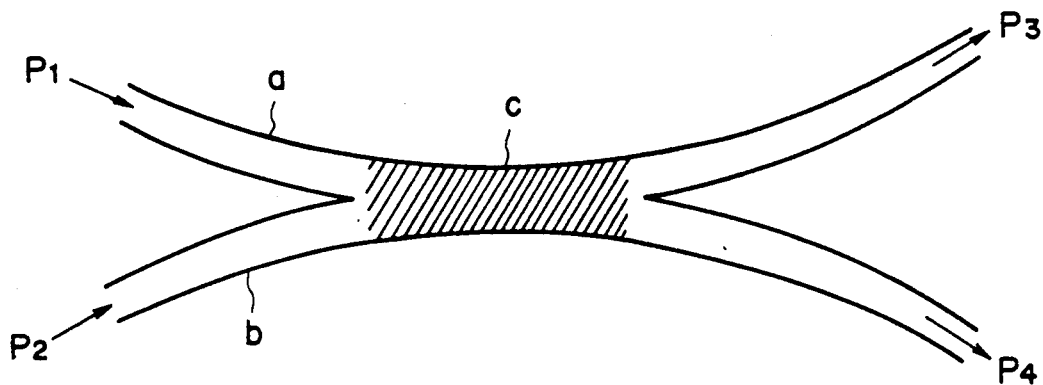
FIG. 1 shows a prior art non-linear optical device.
Figure 2:
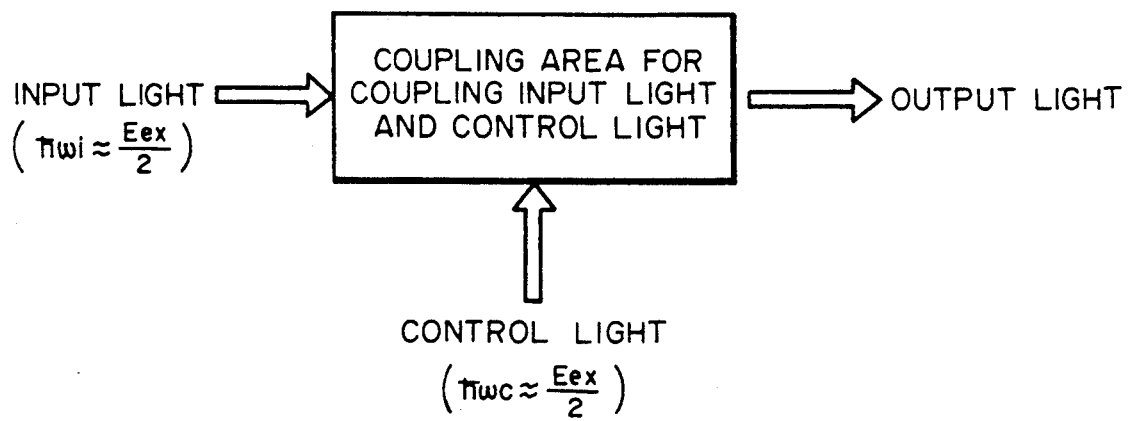
FIG. 2 shows a conceptual view of a non-linear optical device of the present invention.

FIG. 2 conceptually shows the present invention in a most general form. An input light and a control light coact in a coupling area (which corresponds to the area c in FIG. 1) by the non-linear optical effect, and a resulting modulated input light is produced as an output light.

FIG. 3 shows a perspective view of one embodiment of the present invention which embodies the configuration shown in FIG. 2. FIG. 4 shows a sectional view, taken along a line AA', of the device shown in FIG. 3. For the convenience of explanation, $Al_xGa_{1-x}As$ is used as the semiconductor although any semiconductor which can form the quantum well structure may be used. A ridge type wave guide is used as the optical wave guide although any wave guide which is formed by the semiconductor may be used.

In order to fabricate the device, $Al_xGa_{1-x}As$ is grown on an n-type GaAs substrate 4 by molecule beam epitoxy (MBE) method to sequentially form lower clad layers 3' (n-type) and 3 (non-doped), an MQWS 1, and upper clad layers 2 (non-doped) and 2' (n-type). Those layers are etched from the top thereof by a reactive ion beam to form the structure shown in FIG. 3 in which two ridge type wave guides $G_1$ and $G_2$ having recessed stripes are coupled near the center. The proportions x of Al in the respective layers may be 0.1~1.0 in the clad layers, 0~0.1 in the well layer of the MQWS, and 0.4~1.0 in the barrier layer. The thicknesses of the respective layers may be 1~5 μm for the layer 3', 0.2~2 μm for the layer 3, 0.2~2 μm for the layer 2, 0.1~5 μm for the layer 2', 0.1~2 μm for the MQWS 1, and 0.2~0.9 μm for the distance from the bottom of the ridge to the top of the MQWS. The widths of the respective ridges are preferably 1~4 μm. The width of the coupling area may be 2~8 μm and the length thereof may be several hundreds μm~several mm.

The design of the wave guide structure may follow that of the normal NOD (which uses the semiconductor in the coupling area). Accordingly, the explanation thereof is omitted and the characteristic portions of the present invention are explained in detail.

One feature of the present invention resides in the structure which makes use of the GDM effect. As shown, in order to apply the electric field to the MQWS, MQWS 1 and the adjacent clad layers 2 and 3 are non-doped and the outer clad layers 2' and 3' are doped with impurities. In the coupling area, an electrode 10 is attached onto the clad layer 2'. An electrode is also attached to the substrate and a voltage is externally applied from a power supply 11. The magnitude $F_{bias}$ of the biasing electric field should be selected such that the distance between the centers of gravity of the electron e and the hole h which constitute the exciton is from a fraction of to substantially equal to effective Bohr radius R, as shown in FIG. 5, in which W denotes the well layers of the MQWS, and $B_1$ and $B_2$ denote the barrier layers of the MQWS.

The clad layers 2' and 3' may be doped in the same polarity, but it is better to dope in opposite polarities as shown and apply the reverse bias in view of the homogenuity of the electric field and the low ineffective current. The supply of voltage need not necessarily be done by the external power supply, but an interval electric field created by doping the clad layers 2' and 3' in the opposite polarities may be sufficient if the well layers are thick and the total thickness of the layers 1, 2 and 3 are relatively thin. In this case, however, the thicknesses and the doping in the respective layers must be precisely controlled.

What is important is that the structure of the MQWS, the electric field applied and the wavelength of the light used are properly selected to meet the following conditions in order to make use of the GDM effect.

(a) a well layer of the quantum well structure has substantially the same thickness as a Bohr radius of an exciton, (b) the magnitude of the biasing electric field is selected such that a distance between centers of gravity of an electron and a hole which constitute the exciton is from a fraction of to substantially equal to the effective Bohr radius, (c) the thickness and the potential of a barrier layer of the quantum well structure are selected such that the increase in the width of the absorption peak of the exciton which is caused by the ionization due to the tunneling effect of exciton under the biasing electric field is smaller than the width of the absorption peak under no electric field, (d) the wavelength of the light to activate the device is selected such that the energy $\hbar\omega$ of the photon is substantially equal to or slightly smaller than $E_{ex}/2$, where $E_{ex}$ is the generation energy of the exciton of the quantum well structure, and (e) the light which activates the device is a polarized light whose electric field vector has a component normal to the layer of the quantum well structure. More specifically, let us consider an MQWS having lamination of a GaAs well layer having a thickness of $L_2$ and an $Al_{0.45}Ga_{0.55}As$ barrier layer having a thickness of $L_B$.

As to the condition (a) above, since the effective Bohr radius of the GaAs exciton is, approximately 120 Å, $L_z$ is set to substantially the same (for example, 80~200 Å).

Figure 6:
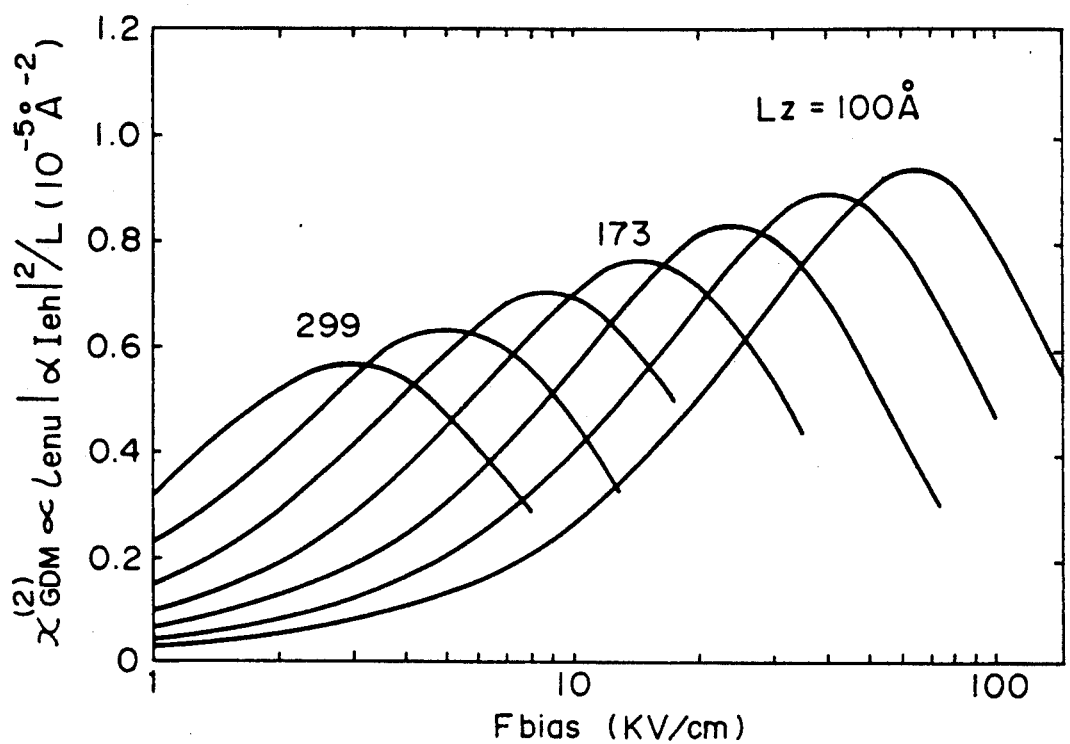
FIGS. 6 and 7 show changes in non-linear acceptability to various biasing electric fields, and FIGS. 8A–8E other non-linear optical devices to which the present invention is applicable and input/output characteristics thereof.
Figure 7:
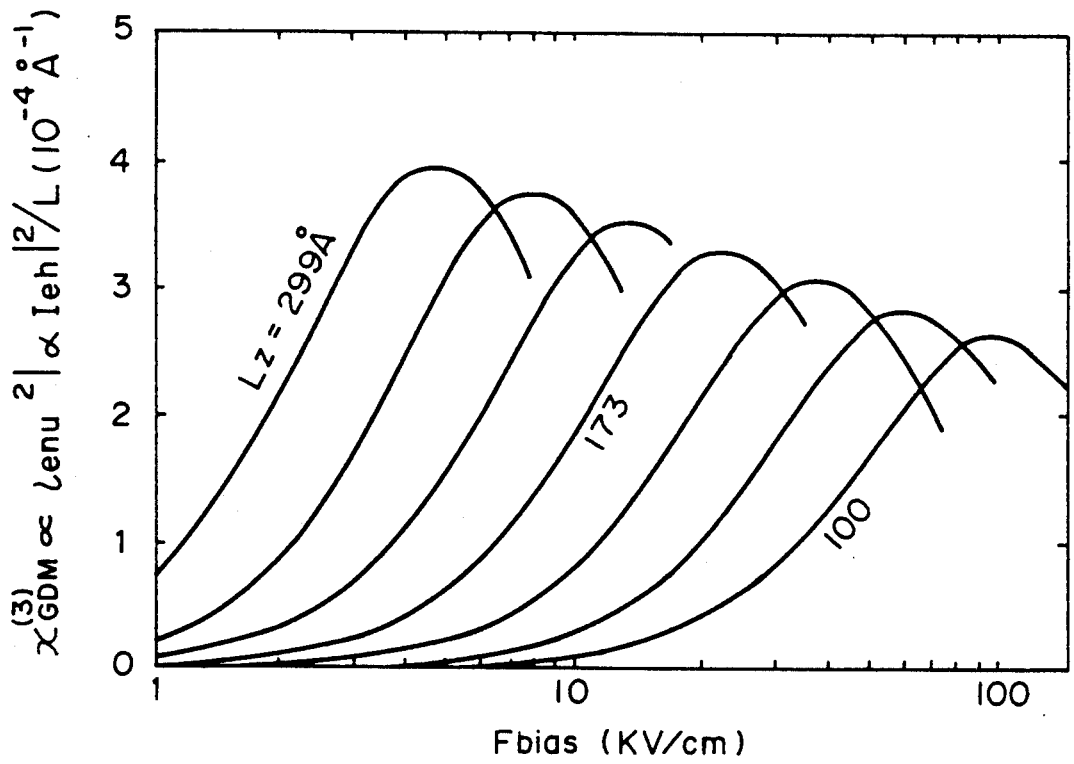

As to the condition (b), the magnitude $F_{bias}$ of the biasing electric field which meets the condition (b) changes with $L_z$. This is illustrated in FIGS. 6 and 7, which shows the magnitudes of $\chi^{(2)}$ and $\chi^{(3)}$ caused by the GDM effect when $L_z$ is 100 Å, 120 Å, 144 Å, 173 Å 207 Å, 249 Å and 299 Å, respectively. The ordinate in FIG. 6 represents a factor which is proportional to $\chi^{(2)}$, and the ordinate in FIG. 7 represents a factor which is proportional to $\chi^{(3)}$. If the nonlinearity which is required for the operation of the NOD is quadratic, the nonmagnitudes $F_{bias}$ around the peaks in the curves of FIG. 6 are appropriate. (For example, if $L_Z=100$ Å, their $F_{bias} \approx 70$ kV/cm, and if $L_Z=173$ Å, then $F_{bias} \approx 15$ kV/cm). In other words, this is the condition for the condition (b) above. Similarly, if the nonlinearity which is required for the operation of the MOD is cubical, the magnitudes Fbias around the peaks of the curves of FIG. 7 are appropriate. Similar curves for other QWS may be simply derived in the manner described in the above-mentioned article.

As to the condition (c), if the barrier layer is too thin (for example 10 Å) or the energy of the barrier is too low (for example, x=0.1) when the biasing electric field of the magnitude determined in the manner described above is applied, the exciton is unstable and no GDM effect appears. The condition to prevent this is given by the condition (c). For example, in the MQWS of FIGS. 6 and 7, it has been known that it is sufficient that $L_B$ is equal to 60 Å for any $L_Z$. It should be noted that too large a $L_B$ is not good, because the density of the well in the MQWS decreases if $L_B$ is too large and the GDM effect may not be fully utilized. It is best to add a slight thickness to $L_B$ which meets the condition (c).

As to the condition (d), it should be noted that Eex changes with the magnitude of the biasing electric field. For example, when $L_Z$=120 Å, Eex=1.446 eV if $F_{bias}$=0, and Eex=1.438 eV if $F_{bias}$=50 kV/cm. The photo energy hω must comply with one-half of the latter. If it is set slightly below one-half (more specifically, Eex−2 hω is substantially equal to or slightly larger than the half-value half-width of the absorption peak of the exciton. For example, hω=0.717 eV), not only the normal interband absorption (linear absorption) but also the two-photon absorption are eliminated. As a result, $\chi^{(n)}/\alpha$ which is the figure of merit of the NOM significantly increases because not only the numerator increases by the GDM effect but also the denominator decreases.

Finally, the reason why the condition (e) is necessary is that $\chi^{(n)}$ which increases by the GDM effect is limited to that whose foot of tensol has a component normal to the layer of the QWS.

Figure 8A:
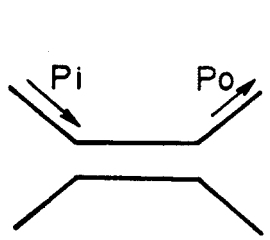
Figure 8A:
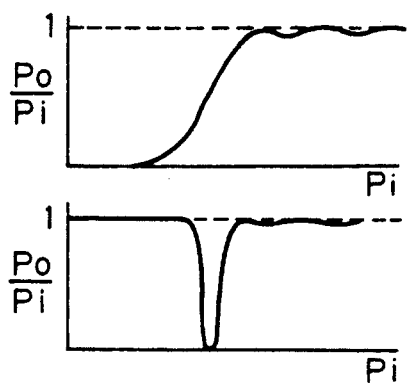
Figure 8B:
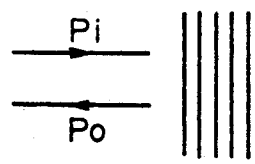
Figure 8B:
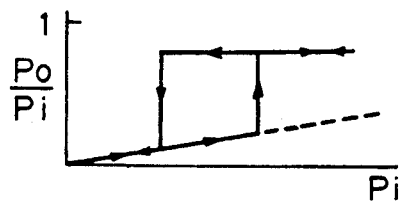
Figure 8C:
Figure 8C:
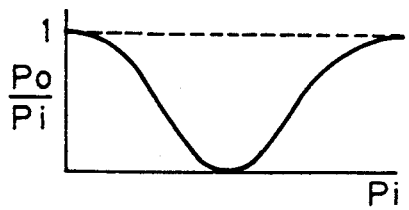
Figure 8D:
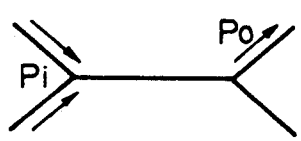
Figure 8D:
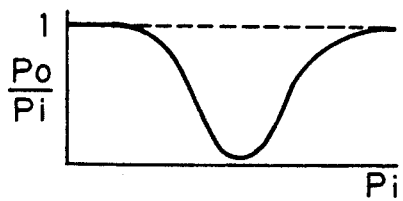
Figure 8E:
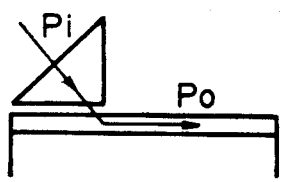
Figure 8E:
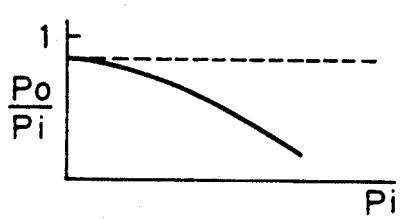

The type of the NOD is not limited to that described above. Some other examples are shown in FIGS. 8A~8E in which conceptual structures of the devices are shown on the left side. FIG. 8A shows a directive coupler, FIG. 8B shows a distributed feedback type grating, FIG. 8C shows a Mach-Zehnder interferometer, FIG. 8D shows a mode sorter, and FIG. 8E shows a prism coupler, in which Pi denotes an input light and Po denotes an output light. The curves on the right side show input/output characteristics of the respective devices. The abscissa represents a power of the input-/output power and the ordinate represents the ratio of the output light power to the input light power. Of the two curves of FIG. 8A, the upper shows one beat length and the lower shows ½ beat length.

In any NOD, the performance is remarkably improved if the NOM and the light are selected as shown in the embodiment.

As explained above, the following advantages are offered by the present invention.

(I) By using the light which meets hω≈Eex/2, the light pulse is hard to be distorted because the dispersion of the (linear) refractive index is small compared to the band end. Accordingly, it is possible to apply the extremely short pulse at the high repetition frequency to activate the NOD in order to attain the very high speed processing.

(II) By using the light which meets hω≈Eex/2, there is little absorption in the NOM. Accordingly, the light intensity is not significantly attenuated each time the light passes through each NOD, and it is not necessary to frequently amplify the light in the course of transmission. When the light which meets hω<Eex<2 is used, the absorption by the two-photon absorption is eliminated as well.

(III) As to $\chi^{(n)}$ which is the figure of merit of the NOM used for the NOD, $\chi^{(n)}$ has a much larger value than that of the bulk crystal because of the GDM effect. Further, since α is small as described in (II), the figure of merit is very large. As a result, a smaller device size, the operation at lower light power and larger light modulation than those of the conventional NOD are attained.

(IV) Since the response speed of the GDM effect is very high (less than 1 psec), the very high speed operation of the NOD is attained together with (I).

(V) Since the semiconductor is used as the NOM, it can be readily integrated with the electrical device or light emitting device.

I claim:

1. A non-linear optical device for transmitting light or carrying out optical signal processing by using a non-linear optical material having a biasing electric field applied perpendicularly to a semiconductor laminated to form a quantum well structure, characterized by:
   (a) a well layer of the quantum well structure having substantially the same thickness as a Bohr radius of an exciton;
   (b) the magnitude of the biasing electric field being selected such that a distance between centers of gravity of an electron and a hole which constitute the exciton is from a fraction of to substantially equal to the effective Bohr radius;
   (c) the thickness and the potential of a barrier layer of the quantum well structure being selected such that the increase in the width of the absorption peak of the exciton which is caused by the ionization due to the tunneling effect of the exciton under the biasing electric field is smaller than the width of the absorption peak under no electric field;
   (d) the wavelength of light used to activate the device being selected such that the energy hω of the photon us substantially equal to or slightly smaller than Eex/2, where Eex is the generation energy of the exciton of the quantum well structure; and
   (e) the light which activates the device is polarized light whose electric field vector has a component normal to the layer of the quantum well structure.

2. A non-linear optical device according to claim 1 further comprising electrodes for applying the biasing electric field to said semiconductor and an external power supply connected to said electrodes.

3. A non-linear optical device according to claim 1 wherein said semiconductor comprises a substrate, an optical wave guide layer of a multi-quantum well structure formed on said substrate and a pair of clad layers formed on the opposite sides of said optical wave guide layer.

4. A non-linear optical device according to claim 3 wherein said optical wave guide layer comprises two-stripe optical wave guide layers having portions thereof coupled together at a predetermined area.

5. A non-linear optical device according to claim 4 further comprising an electrode formed in said coupling area to apply to biasing electric field to said optical wave guide layer, and an external power supply connected to said electrode.

6. A non-linear optical device according to claim 3 wherein each of said clad layers is doped with impurity in the opposite polarity to each other.

7. A non-linear optical device according to claim 3 wherein said substrate, said optical wave guide layer and said clad layers are made of GaAs and AlGaAs.

* * * * *

UNITED STATES PATENT AND TRADEMARK OFFICE
CERTIFICATE OF CORRECTION

PATENT NO. : 5,005,933
DATED : April 9, 1991
INVENTOR(S) : AKIRA SHIMIZU

It is certified that error appears in the above-identified patent and that said Letters Patent is hereby corrected as shown below: On the title page:

AT [19] UNITED STATES PATENT

"Shimuzu" should read --Shimizu--.

AT [75] INVENTOR

"Akira Shimuzu," should read --Akira Shimizu,--.

AT [56] REFERENCES CITED

U.S. Patent Documents,
"Shimuzu et al." should read --Shimizu et al.--.

Other Publications,
"Shimuzu, A.," should read --Shimizu, A.,--
(both occurrences).

AT [57] ABSTRACT

Line 19, "n$\omega$" should read --$\hbar\omega$--.

UNITED STATES PATENT AND TRADEMARK OFFICE
CERTIFICATE OF CORRECTION

PATENT NO. : 5,005,933

DATED : April 9, 1991

INVENTOR(S) : AKIRA SHIMIZU

It is certified that error appears in the above-identified patent and that said Letters Patent is hereby corrected as shown below:

COLUMN 1

Line 14, "Ligh-" should read --Light- --.
    Line 15, "twave" should read --wave-- and "6,953" should read --Vol. 6, No. 6, pp. 953-970--.
    Line 22, "side) A" should read --side).  A--.
    Line 33, "point" should be deleted.
    Line 35, "con-" should be deleted.
    Line 36, "ductor" should be deleted and "is and" should read --is used and--.
    Line 42, "energy hω" should read --energy $\hbar\omega$--.
    Line 43, "hω≈Eex," should read --$\hbar\omega$≈Eex,--.
    Line 63, "hω" should read --$\hbar\omega$--.
    Line 67, "hω≧Eex/2" should read --$\hbar\omega$≧Eex/2--.

COLUMN 2

Line 17, "ity," should read --ity--.
    Line 28, "energy hω" should read --energy $\hbar\omega$--.
    Line 35, "inventors" should read --inventor--.
    Line 36, "hω≈Eex/2" should read --$\hbar\omega$≈Eex/2--.
    Line 47, "hω≈Eex/2." should read --$\hbar\omega$≈Eex/2.--.
    Line 52, "hω" should read --$\hbar\omega$--.

COLUMN 3

Line 12, "FIGS. 8A-8E other" should read --FIGS. 8A-8E show other--.

UNITED STATES PATENT AND TRADEMARK OFFICE
CERTIFICATE OF CORRECTION

PATENT NO. : 5,005,933
DATED : April 9, 1991
INVENTOR(S) : AKIRA SHIMIZU

Page 3 of 4

It is certified that error appears in the above-identified patent and that said Letters Patent is hereby corrected as shown below:

COLUMN 4

Line 3, "to effective" should read --to the effective--.
Line 10, "homogenuity" should read --homogeneity--.
Line 35, "of exciton" should read --of the exciton--.
Line 39, "energy hω" should read --energy $\hbar\omega$--.
Line 48, "$L_2$" should read --$L_z$--.

COLUMN 5

Line 1, "magnitudes Fbias" should read --magnitudes $F_{bias}$--.
Line 21, "energy hω" should read --energy $\hbar\omega$--.
Line 25, "hω=0.717 eV)," should read --$\hbar\omega$=0.717 eV),--.
Line 56, "hω≈Eex/2," should read --$\hbar\omega$≈Eex/2,--.
Line 63, "hω≈Eex/2," should read --$\hbar\omega$≈Eex/2,--.
Line 68, "hω<Eex<2" should read --$\hbar\omega$<Eex<2--.

UNITED STATES PATENT AND TRADEMARK OFFICE
CERTIFICATE OF CORRECTION

PATENT NO. : 5,005,933
DATED : April 9, 1991
INVENTOR(S) : AKIRA SHIMIZU

It is certified that error appears in the above-identified patent and that said Letters Patent is hereby corrected as shown below:

<u>COLUMN 6</u>

Line 37, "energy hω" should read --energy $\hbar\omega$--.
Line 38, "us" should read --is--.

Signed and Sealed this

Twenty-ninth Day of June, 1993

MICHAEL K. KIRK

Attest:

Attesting Officer       Acting Commissioner of Patents and Trademarks